US00H002187H

(19) United States

(12) Statutory Invention Registration

Yuchimiuk

(10) Reg. No.: US H2187 H

(43) Published: Apr. 3, 2007

(54) SYSTEM AND METHOD FOR GENDER IDENTIFICATION IN A SPEECH APPLICATION ENVIRONMENT

(75) Inventor: John Yuchimiuk, Reading, PA (US)

(73) Assignee: Unisys Corporation, Blue Bell, PA (US)

(21) Appl. No.: 10/186,049

(22) Filed: Jun. 28, 2002

(51) Int. Cl.
*G10L 15/00* (2006.01)

(52) U.S. Cl. ..... 704/246

(58) Field of Classification Search ..... 704/246, 704/252, 270, 4, 8, 9, 10; 705/10
See application file for complete search history.

(56) References Cited

U.S. PATENT DOCUMENTS

| | | | | | |
|---|---|---|---|---|---|
| 5,715,396 | A | | 2/1998 | Chatwani et al. | 395/200.15 |
| 5,797,122 | A | | 8/1998 | Spies | 704/255 |
| 5,870,709 | A | | 2/1999 | Bernstein | 704/275 |
| 5,953,701 | A | | 9/1999 | Neti et al. | 704/254 |
| 6,058,166 | A | | 5/2000 | Osder et al. | 379/88.22 |
| 6,122,615 | A | * | 9/2000 | Yamamoto | 704/252 |
| 6,157,913 | A | * | 12/2000 | Bernstein | 704/275 |
| 6,233,317 | B1 | | 5/2001 | Homan et al. | 379/88.05 |
| 6,493,671 | B1 | * | 12/2002 | Ladd et al. | 704/270 |
| 6,684,194 | B1 | * | 1/2004 | Eldering et al. | 705/10 |
| 6,931,375 | B1 | * | 8/2005 | Bossemeyer et al. | 704/246 |

FOREIGN PATENT DOCUMENTS

JP 11-296193 A * 10/1999

OTHER PUBLICATIONS

Boroditsky, L. & Schmidt, L.A., "Sex, Syntax, and Semantics", 2000, Proceedings of the 22nd Annual Meeting of the Cognitive Science Society, pp. 1–6.*

* cited by examiner

*Primary Examiner*—Dan Pihulic

(74) *Attorney, Agent, or Firm*—Lise A. Rode; Mark T. Starr

(57) ABSTRACT

An automatic speech recognizer (ASR) is used in conjunction with a gender-neutral grammar to recognize words uttered by a user of a speech application at a given state of the dialogue implemented by the speech application. An identification of the gender (i.e., male or female) of the user is then made from one or more of the recognized words based on gender-specific characteristics of the written language of the user. The identified gender is used in various ways to improve the performance of the speech application.

28 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM AND METHOD FOR GENDER IDENTIFICATION IN A SPEECH APPLICATION ENVIRONMENT

FIELD OF THE INVENTION

The present invention relates to the field of speech applications involving a dialogue between a human and a computer. More specifically, the present invention relates to a system and method for improving the performance of a speech application deployed in an environment in which the written language (which may be any language set down in writing in any of various ways) of a user exhibits gender specific characteristics.

BACKGROUND

A conversation (dialogue) between two entities is a series of exchanges where each participant listens to at least some part of what the other participant is speaking, and the other participant reacts by speaking or performing some action. Creating speech applications, which are computer applications that engage in such dialogues with people, is a complex task.

A speech application typically proceeds in accordance with a call flow that defines the dialogue between a user and the computer on which the speech application executes. The call flow of a speech application is typically comprised of a series of "states," which correspond to different stages in the dialogue (e.g. initial state, get-identity-of-speaker state, take-first-item-in-order state, etc.). Each of these states is typically associated with a "prompt," which the speech application may use to prompt the user, a set of expected "responses," which the speech application can expect from the user, and a way to process the prompt given, response received, and any other external data to perform an action or to move to another state.

A speech application must be able to detect an utterance (e.g., "response") spoken by a user and convert it into some non-audio representation, for example, into text. A speech application typically relies on an automatic speech recognizer (ASR) to perform this task. Once an ASR determines what a speaker has said, the ASR itself, or in some cases another component such as a natural language interpreter, may receive the non-audio representation of the utterance and based on that utterance, the state of the conversation to that point, and any external factors that need to be considered, determine the meaning of the utterance.

ASRs are available commercially from a variety of different vendors. Examples of commercially available ASRs include the Nuance product commercially available from Nuance Communications, Inc., the SpeechPearl product commercially available from Philips Electronics N.V., and the OpenSpeech Recognizer commercially available from SpeechWorks International, Inc.

With advances in speech recognition technology and computing power, speech recognizers for use with many speech applications today are of the speaker independent, continuous speech variety. An ASR is "speaker independent" if it does not need to have heard the speaker's voice before in order to recognize the speaker's utterance. An ASR is "continuous" if it does not require the speaker to pause between words.

For anything but the most basic applications, a speech application cannot know for certain what the user will say or how the user will say it. A useful speech application should be constructed to be ready for all reasonable contingencies. In order to allow for complex responses, when the speech application "listens" via an ASR for one response from a set of responses, it does so using a "grammar" for those responses. That is, the speech application "loads" a particular grammar into the ASR for a given set of expected responses This grammar specifies everything the ASR will listen for when it is listening for a given response.

As an example, a grammar for the expected reply to the prompt "What method of shipping would you like to use?" might be represented as (("I want to use"| "I'd like to use"| "Please use") ("Regular mail"| "Express shipping"|"Next day mail")). Under this set of rules, the expected replies would be "I want to use regular mail"; "I'd like to use regular mail"; "Please use regular mail"; "Regular mail"; "I want to use express shipping"; "I'd like to use express shipping"; "Please use express shipping"; "Express shipping"; "I want to use next day mail"; "I'd like to use next day mail"; "Please use next day mail"; or "Next day mail". This notation is referred to as Backus-Naur Form (BNF). Other formats can be used. One such format is the XML format promulgated by the W3C organization.

Commercially available ASRs typically have their own grammar file format specified by the vendor. A speech application developer is required to adhere to the grammar format of the specific ASR being used. Development tools are available to aid a developer in generating the necessary grammars for a given speech application. One such tool is the Natural Language Speech Assistant (NLSA) developed by Unisys Corporation, assignee of the present invention. Further information concerning this tool is provided in U.S. Pat. No. 5,995,918, issued Nov. 30, 1999, entitled "System and Method for Creating a Language Grammar Using a Spreadsheet or Table Interface."

There are written languages, for example Russian, Ukrainian, and Polish, where certain parts of speech reflect the gender (male or female) of the speaker. In Russian, Ukrainian and Polish, for example, this phenomenon occurs with past tense verbs. As shown in the following example, in the Russian language, male and female speakers will utter different words to express the same phrase.

| English Phrase | male would say | female would say |
|---|---|---|
| "I opened the window" | Я открыл окно | Я открыла окно |
| "I completed the exam" | Я сдал экзамен | Я сдала экзамен |
| "I was afraid" | Я боялся | Я бояалсь |
| "I came" | Я пришёл | Я пришла |
| "I lost it" | Я потерял это | Я потеряла это |

Consequently, the designer of an ASR grammar to be used to recognize the speech of a Russian speaker may have to include representations of both the female and male versions of a given spoken phrase in order for the grammar to remain speaker independent, i.e., gender neutral.

For such languages, a gender-neutral grammar can become quite large as it has to be capable of handling both the male and female versions of various phrases. Unfortunately, the larger a grammar becomes, the less accurate an ASR will perform, as there are more opportunities for mistakes and misrecognitions. The speed of recognition is also affected when grammars become large. Consequently, there is a need for systems and methods for improving the speech recognition accuracy in, and overall dialogue design of, speech applications intended to be used with speakers whose written languages exhibit these kinds of gender specific characteristics. The present invention addresses this need.

SUMMARY

The present invention is primarily directed to a system and method for improving the performance of a speech application deployed in an environment in which the written language of a user exhibits gender specific characteristics, such as the Russian, Ukrainian, and Polish languages mentioned above. According to the invention, an automatic speech recognizer is used in conjunction with a gender-neutral grammar to recognize words uttered by a user of the speech application at a given state of the dialogue implemented by the speech application. An identification of the gender (ie., male or female) of the user is then made from one or more of the recognized words based on gender-specific characteristics of the written language of the user.

According to one further aspect of the invention, the gender identification may then be used at a subsequent state of the dialogue to select a grammar specific to the identified gender of the user. Use of a gender specific grammar may increase the accuracy of subsequent recognition attempts.

According to another further aspect of the invention, the speech application may compare a gender identification made at a prior state of the dialogue with a gender identification made at a subsequent state and may adjust a confidence level associated with a recognition of words by the ASR at that subsequent state based on a comparison of those gender identifications. For example, if the gender of a user is identified from the recognized words uttered by the user at a first state with a relatively high confidence level, and then the words recognized at a subsequent state indicate a different gender, then the confidence level associated with the recognition of words at that subsequent state may be lowered since the gender identification does not match that of the previous state, i.e., the mismatch between the gender identifications suggests a possible misrecognition.

According to a still further aspect of the invention, the identification of the gender of a user may be used by the speech application to provide gender-specific prompts to the user at various states of the dialogue.

The invention may also be applied to written communications, and prompts and grammars used to interpret written communications can also be modified in the same way as described here for oral communications with a user. For example, a spy program in a chat room, or a computer-based psychotherapy program, or even a banking interface program, will have much greater success in convincing a user that he or she is corresponding with another human, or at least raising the comfort level of the user, if the gender-specific parts of speech are appropriately used in the written conversation. However, the invention's primary present purpose is for oral communications using speech recognizer applications.

Other features and advantages of the present invention will become evident hereinafter.

BRIEF DESCRIPTION OF THE FIGURES

The foregoing summary, as well as the following detailed description, is better understood when read in conjunction with the appended drawings. For the purpose of illustrating the invention, there is shown in the drawings exemplary constructions of the invention; however, the invention is not limited to the specific methods and instrumentalities disclosed. In the drawings.

FIG. I illustrates the basic processing flow of an exemplary speech application.

DETAILED DESCRIPTION

Figure 1:
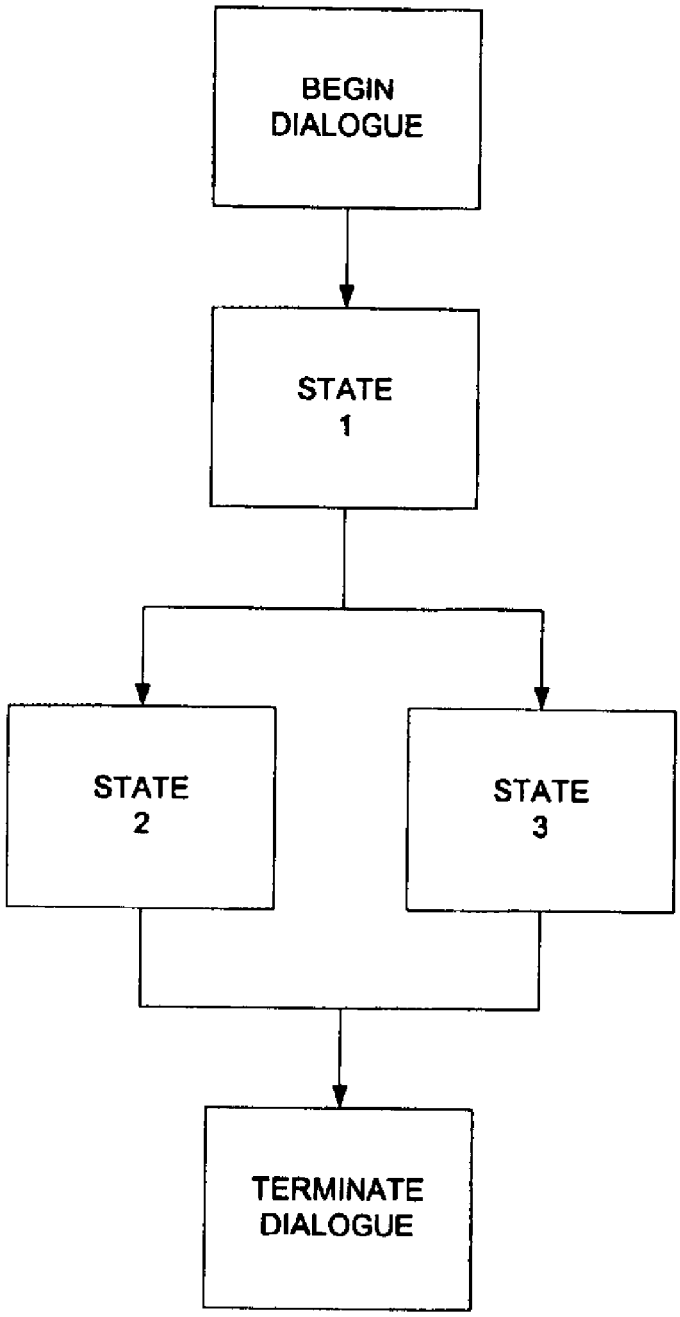

The present invention is directed to a system and method for improving the performance of a speech application deployed in an environment in which the written language of a user exhibits gender specific characteristics, such as the Russian, Ukrainian, and Polish languages mentioned above. According to the invention, an automatic speech. recognizer is used in conjunction with a gender-neutral grammar to recognize words uttered by a user of the speech application at a given state of the dialogue implemented by the speech application. An identification of the gender (i.e., male or female) of the user is then made from one or more of the recognized words based on gender-specific characteristics of the written language of the user.

For example, a speech application that is part of an interactive voice response (IVR) system that provides customer service information to cell phone users may prompt a user with the question "What happened to your cell phone?" One response to such a question may be "I lost it." In languages such as Russian, Ukrainian, and Polish, that response may be verbalized differently (as well as written differently) depending upon the gender of the speaker. In particular, in these languages, past tense verbs are written and spoken differently depending on the gender of the writer/speaker. For example, the English phrase "I lost it" would be spoken by a Russian male as "Я потерял это," whereas a Russian female would say "Я потеряла это." Thus, this written language exhibits gender specific characteristics, ie., the way in which a phrase is written and spoken is different depending upon the gender of the speaker. A gender-neutral grammar for an automatic speech recognizer (ASR) designed to enable the ASR to listen for either of the gender-based forms of the Russian expression of the phrase "I lost it" would include one grammar rule for the expression of the phrase by a male and another grammar rule for the expression of the phrase by a female. An identification of the gender of the speaker can thus be made from the words recognized by the ASR based on the gender-specific characteristics of the written language of the user. Specifically, if the ASR, using the gender-neutral grammar, recognizes the speaker to have said "Я потерял это," then the gender of the speaker would be identified as "male," whereas if the ASR recognizes the speaker to have said "Я потеряла это," then the gender of the speaker would be identified as "female."

An automatic speech recognizer typically returns an ASCII representation of what it recognizes a speaker to have said, along with a value indicative of a confidence level associated with that recognition, ie., a value that expresses how confident the ASR is that the recognized words are indeed what the speaker said. Preferably, an identification of the gender of the speaker based on the recognized words uttered by a user as described above, would only be made if the confidence level associated with the recognition of those words is above a certain threshold level. For example, assume that the confidence level associated with a given recognition attempt is expressed as a percentage, 0% being the lowest and 100% being the highest. One embodiment of the present invention may set a confidence level of 80% as the threshold with respect to which a gender identification will be made. Continuing with the above example, if the ASR recognizes the speaker to have said "Я потерял это" (male) but the confidence level associated with that recognition is only 60%, then a gender identification will not be made based on that utterance. On the contrary, if the confidence level associated with that recognition attempt was 95%, then the speaker's gender would be identified as "male." In other embodiments, however, the confidence level may play no role in the gender identification.

As described hereinafter in greater detail, a gender identification made in the manner described above can be used in several ways to improve the overall performance of the speech application. According to one aspect of the invention, the gender identification may be used at a subsequent state of the speech application dialogue to select a grammar specific to the identified gender of the user. According to another aspect of the invention, the speech application may compare a gender identification made at one state of a speech application dialogue with a gender identification made at a subsequent state and may then adjust the confidence level associated with a recognition of words by the ASR at that subsequent state based on a comparison of those gender identifications. According to yet another aspect of the invention, the identification of the gender of a user may be used by the speech application to provide gender-specific prompts to the user at various states of the dialogue.

FIG. 1 is a flow diagram illustrating the general processing flow of an exemplary speech application. A speech application typically implements a dialogue between a user and a computer in order to provide some service to the user, such as Voice Mail, Bank By Phone, Emergency Number Facilities, Directory Assistance, Operator Assistance, Call Screening, Automatic Wake-up Services, and the like. Speech applications are an integral part of many interactive voice response (IVR) systems in use today.

The dialogue that a speech application carries out is often expressed as a series of interconnected states, e.g., BEGIN DIALOGUE, STATE 1, STATE 2, STATE 3, TERMNATE DIALOGUE, etc., that define the flow of the dialogue. In the example shown, the dialogue may transition from STATE I to either STATE 2 or STATE 3, and then end at the TERMINATE DIALOGUE state. Essentially, each state of a dialogue represents one conversational interchange between the application and a user. Components of a state are defined in the following table:

| Component | Function | Examples |
|---|---|---|
| Prompt | Defines what the speech application says to the end user | Would you like to place an order? |
| Response | Defines every possible user response to the prompt, including its implications to the application (i.e. meaning, content) | YES (yes, yes please, certainly . . .)<br>NO (No, not right now, no thanks . . .)<br>HELP (Help, How do I do that . . .)<br>OPERATOR (I need to talk to a person) . . . |
| Action | Defines the action to be performed for each response based on current conditions | YES/System Available - go to PLACEORDER state<br>YES/System Unavailable - go to CALLBACKLATER state . . . |

Figure 2:
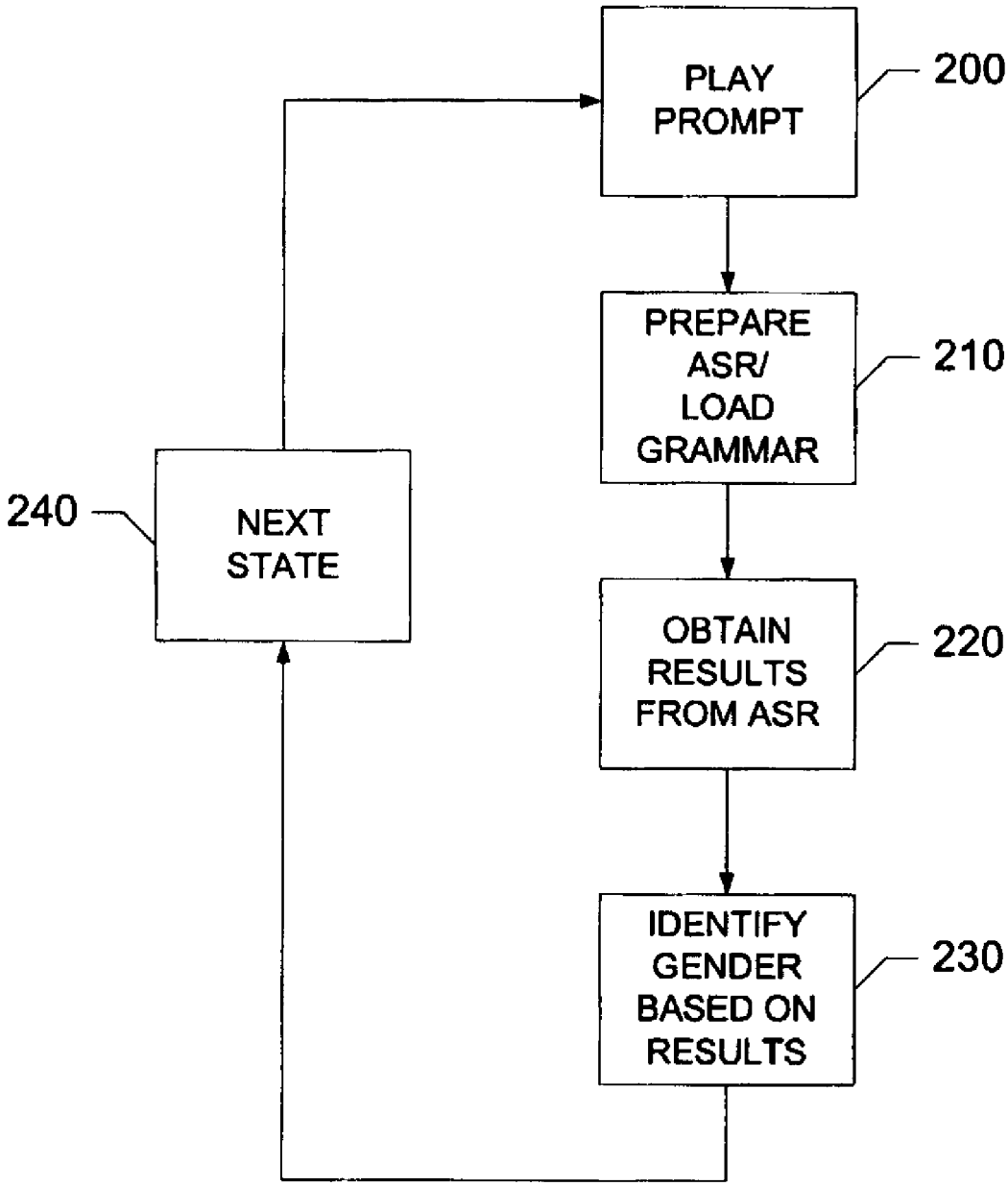
FIG. 2 is a flow diagram illustrating one embodiment of a method of the present invention.

FIG. 2 illustrates the processing performed by a speech application at any given state of the dialogue. (If one wanted to adapt this to a written communication program no changes are required except that the prompts will be in writing and the user's responses will also be in writing.) As shown, for example, at step 200, the speech application plays a prompt to the user (e.g., "Would you like to place an order?", "What happened to your cell phone?", etc.). The prompt is typically "played" to a user by outputting an audio signal over whatever interface through which the user is interacting with the speech application. For example, the user may be interacting with the speech application over a telephone handset, or the user may be using a microphone and speakers attached directly to the computer that hosts the application. Alternatively, the prompt may be played over a Voice-over-IP (VOIP) connection. The prompt may initially be in an ASCII format and then converted to an audio signal via a text-to-speech (TTS) converter. Alternatively, the prompt may have been prerecorded and stored on the computer that hosts the speech application such that it can be retrieved from storage and played to the user over the particular audio interface.

Next, at step 210, the speech application prepares an automatic speech recognizer (ASR) for the response phase of the given state by, among other things, loading the ASR with the appropriate grammar containing the rules for recognizing the set of expected responses that a user may utter at that state. According to the present invention, where the speech application is deployed in an environment in which the written language of the speaker exhibits gender specific characteristics (such as Russian, Ukrainian, and Polish), the ASR may be loaded with a gender- neutral grammar containing grammar rules for expected responses that may be uttered by both male and female users. As mentioned above, ASRs are available commercially from a variety of different vendors. Examples of commercially available ASRs include the Nuance product commercially available from Nuance Communications, Inc., the SpeechPearl product commercially available from Philips Electronics N.V., and the OpenSpeech Recognizer commercially available from SpeechWorks International, Inc. Commercially available ASRs typically have their own grammar file format specified by the vendor. A speech application developer is required to adhere to the grammar format of the specific ASR being used when developing grammars for the ASR.

Next, in step 220, the ASR provides the results of its attempt to recognize an utterance by the user. As discussed above, an ASR typically returns an ASCII representation of what it recognizes a speaker to have said, along with a value indicative of a confidence level associated with that recognition, i.e., a value that expresses how confident the ASR is that the recognized words are indeed what the speaker said. The ASR may also perform a natural language understanding function to return an indication of the meaning of the recognized words. In other embodiments, this natural language understanding function may be performed by a separate component, sometimes referred to as a natural language interpreter (NLI). An example of an NLI used to determine the meaning of an utterance as recognized by an ASR is found in U.S. Pat. No. 6,094,635 (in which it is referred to as a "runtime interpreter") and in U.S. Pat. No. 6,321,198 (in which it is referred to as the "Runtime NLI).

In accordance with the present invention, as discussed above, before transitioning to a next state of the dialogue (step 240), the results of the speech recognition attempt by the ASR are analyzed in step 23 in an attempt to identify from those results the gender of the user. As explained above, in accordance with the present invention, the gender of the speaker is identified from the recognized words uttered by the user based on gender-specific characteristics of the written language of the user. For example, in the case of a Russian user that is expected to say "I lost it," if the ASR, using a gender-neutral grammar, recognizes the user to have said "Я потерял это" then the gender of the speaker would be identified as "male," whereas if the ASR recognizes the speaker to have said "Я потеряла это," then the gender of the speaker would be identified as "female."

The reporting of an identified gender to the speech application can be performed in any of a variety of ways. As one example, the grammar rule for a male expression of a given phrase may be associated with a value, e.g., "M", and the grammar rule for a female expression of a given phrase may be associated with a value, e.g., "F." Upon detecting that a particular grammar rule has been met, the ASR may provide such a value to the speech application as part of the results of the recognition attempt. Again, as discussed above, whether the ASR provides such an indication may depend upon a confidence level associated with the particular recognition attempt. In other embodiments, the speech application itself could make a gender identification from the ASCII representation output from the ASR. In either case, the speech application may define a global variable, such as "GENDER," that holds a value such as "M," "F," or "N" to indicate that the gender of the user is male, female, or undetermined (i.e., neutral).

Preferably, the speech application dialogue may be designed to play, at a relatively early state in the dialogue, a prompt to the user that is likely to elicit a gender-specific response based on the gender-specific characteristics of the written language of the user. In this manner, a gender identification can be made early in the dialogue to enable the remainder of the dialogue to take advantage of that identification in the manners described below.

The gender identification obtained in step 230 may be used by the system at a subsequent state to load a gender-specific grammar (i.e., male or female) for that state at step 210, instead of a gender-neutral grammar, as discussed further below. The gender identification may also be used in step 200 at a subsequent state to alter the prompts offered for further communication based on knowing the gender of the user where such gender-specific prompts may be appropriate.

Figure 3:
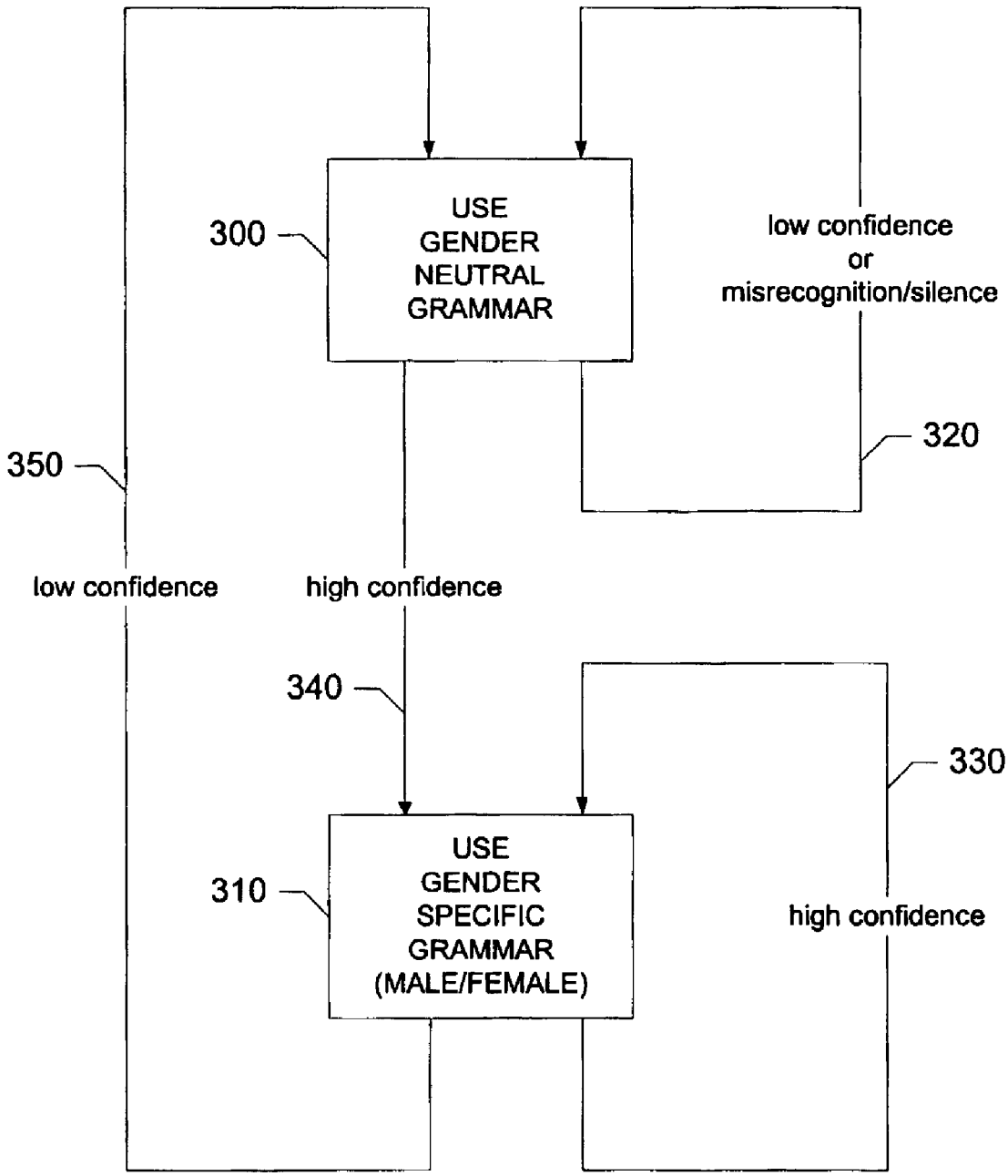
FIG. 3 is a diagram providing further details regarding an aspect of the present invention.

Referring to FIG. 3, a gender identification made at a given state of a speech application dialogue may be us at a subsequent state to select a grammar for use at that state that is specific to the identified ender of the user. According to this aspect of the present invention, the speech applicatio developer will create, for each of at least some of the states of the speech application dialogue, both gender-neutral and gender-specific grammars for that state. For example, a developer creatin grammars for a state at which the expected response of a Russian user will be "I lost it," will create (1) a gender-neutral grammar containing grammar rules for both the male ("Я потерял это") and female ("Я потеряла это") versions of the phrase, a (2) grammar specific to the male gender that will contain a grammar rule for only the male version of the phrase, an (3) a grammar specific to the female gender that will contain only the grammar rule for the female version of the phrase. The developer will do the same for other states at which the expected tterance from a user may reflect similar gender-specific characteristics of the written language of the user. (Concomitantly with the use of grammars (2) and (3), appropriate gender-specific prompts may be used as well, where appropriate).

According to this aspect of the invention, the speech application will initially use the gender-neutral grammars at successive states of the dialogue until an identification of the gender of the user can be made from the ASR results at a given state in the manner described above. If a particular gender is identified (e.g., GENDER=M or GENDER=F), then at subsequent states for which there is both a gender-neutral grammar and a grammar specific to the identified gender, the speech application will load the ASR with the corresponding gender-specific grammar. As mentioned above, use of a gender-specific grammar may enhance the accuracy of the ASR at such subsequent states, because a gender-specific grammar has less grammar rules than a gender-neutral grammar (since it only has to have rules to recognize utterances by one gender).

FIG. 3 is a diagram illustrating further details of how a gender identification can be used to select gender-neutral and gender-specific grammars at various states of a dialogue in accordance with one embodiment of the invention. As shown at 300, a speech application will initially utilize the gender-neutral grammars at various states of a dialogue. However, if a gender identification is made at a particular state in the manner described above based on the results obtained with a gender-neutral grammar, and that recognition has a high confidence level, then as shown at 340, the speech application may transition to the use of gender-specific grammars at subsequent states of the dialogue, as shown at 310. The speech application will continue to employ the appropriate gender-specific grammar based on the previous gender identification (male/female) as long as the confidence associated with the recognition results obtained using those gender-specific grammars remains high, as illustrated at 330. If, however, at a given state of the dialogue, the use of a gender-specific grammar results in one or more recognitions with low confidence levels, the speech application may transition back to the use of the gender-neutral grammars, as illustrated at 350. The speech application will continue to use the gender-neutral grammars if recognition attempts continued to produce low confidence results or in the event of a misrecognition or silence by the user. Again, however, if at any subsequent state a gender identification is again made with high confidence, then the speech application will once again transition to the use of the appropriate gender-specific grammar.

According to another aspect of the invention, which may or may not be used in conjunction with the method of selecting gender-specific grammars based on a gender identification discussed above, the speech application may compare a gender identification made at a prior state of the dialogue from a gender-neutral grammar with a gender identification made at a subsequent state with another gender-neutral grammar and may then adjust a confidence level associated with a recognition of words by the ASR at that subsequent state based on a comparison of those gender identifications. In greater detail, at a given state of the speech application dialogue, an ASR may be loaded with a gender-neutral grammar and a gender identification may be made in the manner described above from the recognized words uttered by a user based on gender-specific characteristics of the written language of the user. At a subsequent state of the dialogue, the ASR may again be loaded with a gender-neutral grammar for that state and a recognition attempt made. That recognition attempt may also produce a gender identification made in the manner described above. According to this further aspect of the invention, the gender identification made at this subsequent state may be compared to the gender identification made at the prior state, and an adjustment may be made to the confidence level associated with the results of the recognition at the subsequent state based on the comparison. For example, if the gender of a user is identified from the recognized words uttered by the user at the prior state with a relatively high confidence level, and then the words recognized at the subsequent state would indicate a different gender, then the confidence level associated with the recognition of words at that subsequent state may be lowered since the gender identification does not match that of the previous state, i.e., the mismatch between the gender identifications suggests a possible misrecognition. On the other hand, if the gender identification at the subsequent state matched the gender identification at the prior state, the confidence level associated with the recognition at that subsequent state may be raised. Thus, the gender identification can be used as a further measure of the confidence associated with a particular recognition attempt.

According to yet another aspect of the present invention, a gender identification made at a given state of a speech application dialogue in the manner described above may be used by the speech application at subsequent states to select prompts to be played to the user that are more appropriate for the identified gender. For example, after identifying the gender of a user as "male," subsequent prompts may address the user with the salutation "Mr.," whereas if the gender of the user is identified as "female," subsequent prompts may address the user with the salutation "Miss" or "Mrs."

Figure 4:
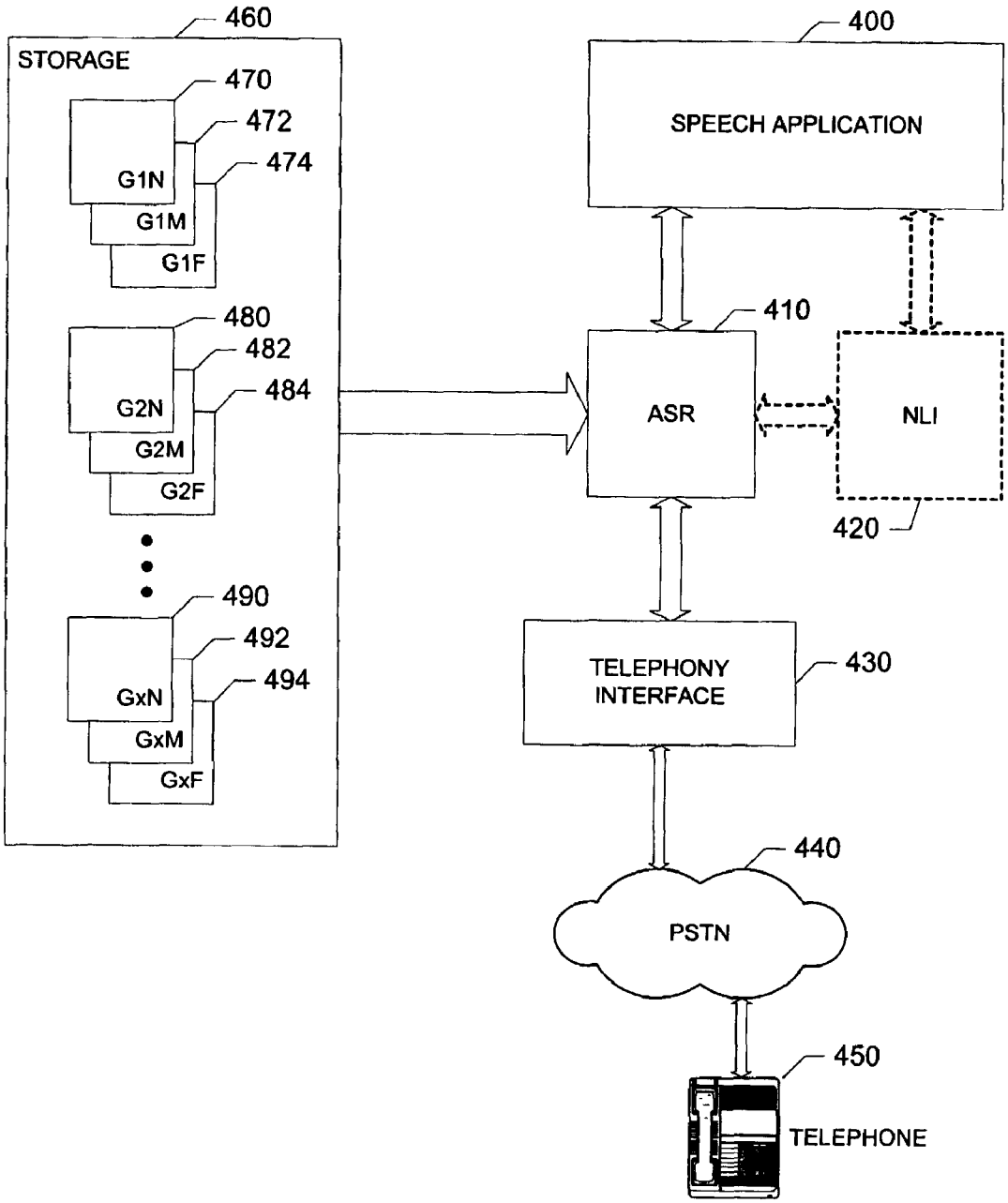
FIG. 4 is a block diagram illustrating one embodiment of a system in which the present invention may be implemented.

FIG. 4 is a block diagram illustrating an exemplary system in which the present invention may be embodied. As shown, the system comprises a speech application 400 that carries out a dialogue with a user, as described above, wherein the dialogue comprises a plurality of states. The speech application may be implemented in a high level programming language, such as, for example, C, C++, or Java. Alternatively, the program code may be implemented in assembly or machine language. In any case, the language may be a compiled or an interpreted language. The speech application may also be developed using any of a variety of commercially available speech application development tools, including, for example, the Natural Language Speech Assistant (NLSA) available from Unisys Corporation.

The speech application 400 interfaces with an automatic speech recognizer (ASR) 410 that, at the direction of the speech application, recognizes words uttered by a user in response to a prompt at a given state of the dialogue based on a grammar specified by the speech application for that state. The ASR may comprise any commercially available or proprietary speech recognizer. In one embodiment, the ASR comprises a speaker independent, continuous speech recognizer.

In the example shown, a user interfaces with the speech application 400 using a telephone 450 connected to the public switched telephone network (PSTN) 440. A telephony interface 430 provides an interface between the PSTN 440 and the speech application 400 and ASR 410 in a conventional manner. In other embodiments, the user may interface with the speech application in other ways, such as via a microphone and speakers attached to the computer on which the speech application executes, via a voice-over-IP (VOIP) connection, or via a voiceXML browser.

The system may further comprise a natural language interpreter (NLI) 420, in the event that its functionality is not provided as part of the ASR 410. The NLI accesses a given grammar, which expresses valid utterances, and associates them with tokens and provides other information relevant to the application. The NLI extracts and processes a user utterance based on the grammar to provide information useful to the application, such as a token representing the meaning of the utterance. This token may then, for example, be used to determine what action the speech application will take in response. As mentioned above, the operation of an exemplary NLI is described in U.S. Pat. No. 6,094,635 (in which it is referred to as the "runtime interpreter") and in U.S. Pat. No. 6,321,198 (in which it is referred to as the "Runtime NLI").

The system further comprises a memory device 460 that stores, for each of at least some of the states of the speech application dialogue, a gender-neutral grammar for that state. For example, as shown, the memory device 460 stores gender-neutral grammars 470, 480, 490 (designated G1N, G2N . . . GxN, respectively) that are each associated with a given state of the dialogue (e.g State 1, State 2 . . . State x, etc.). As further shown, in accordance with one aspect of the present invention discussed above, the memory device 460 may also store, for at least some of the states of the dialogue, gender-specific grammars (472, 474, 482, 484, 492, 494) for those states (e.g., grammars GIM and GIF for State 1, grammars G2M and G2F for State 2, grammars GxM and GxF for State x, and so on). The memory device 460 may comprise any computer-readable storage medium, such as a floppy diskette, CD-ROM, CD-RW, CD-R, DVD-ROM, DVD-RAM, hard disk drive, magnetic tape or any other magnetic, optical, or otherwise machine-readable storage medium.

The system illustrated in FIG. 4 may be used to carry out any of the aspects of the present invention described above. Thus, the ASR 410 may use one of the gender-neutral grammars 470, 480, 490 at a particular state to recognize words uttered by a user of the speech application 400, and the system may then identify a gender (i.e., male or female) of the user from one or more of the recognized words based on gender-specific characteristics of the written language of the user. The gender identification may be used at a subsequent state of the speech application dialogue to select a grammar specific to the identified gender of the user (e.g., one of grammars 472, 474, 482, 484, 492, 494, etc.). The speech application 400 may compare a gender identification made at one state of the dialogue with a gender identification made at a subsequent state and may then adjust the confidence level associated with a recognition of words by the ASR 410 at that subsequent state based on a comparison of those gender identifications. The identification of the gender of a user may also be used by the speech application 400 to provide gender-specific prompts to the user at various states of the dialogue. The system of the present invention can be implemented on any of a variety of computing platforms and is in no way limited to any one computing platform or speech application development environment.

The methods and system described above may be embodied in the form of program code (i.e., instructions) stored on a computer-readable medium, such as a floppy diskette, CD-ROM, DVD-ROM, DVD-RAM, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level programming language, such as, for example, C, C++, or Java. Alternatively, the program code may be implemented in assembly or machine language. In any case, the language may be a compiled or an interpreted language.

As the foregoing illustrates, the present invention is directed to systems and methods for improving the performance of a speech application deployed in an environment in which the written language of a user exhibits gender specific characteristics. It should be appreciated that changes could be made to the embodiments described above without departing from the inventive concepts thereof. It should be understood, therefore, that this invention is not limited to the particular embodiments disclosed, but it is intended to cover all modifications within the spirit and scope of the present invention as defined by the appended claims.

What is claimed is:

1. A method for improving the performance of an application deployed in an environment in which the written language of a user exhibits gender specific characteristics, the method comprising:

(a) recognizing words provided by a user based on a gender-neutral grammar; and (b) identifying a gender of the user from one or more of the recognized words provided by the user, based on gender-specific characteristics of the written language of the user, including the tense of the written language.

2. The method recited in claim 1, further comprising:

(c) recognizing words subsequently provided by the user based on a grammar specific to the identified gender of the user.

3. The method recited in claim 2, further comprising performing (b) and (c) only if a confidence level associated with the recognition of words in (a) is above a predetermined threshold.

4. The method recited in claim 2, further comprising repeating (a) and (b) if a confidence level associated with the recognition of words in (c) is below a predetermined threshold.

5. The method recited in claim 2, wherein prior to performing (a), the method further comprises prompting the user to elicit a response from the user that is likely to exhibit the gender-specific charactetistics.

6. The method recited in claim 1, further comprising:

(c) recognizing words subsequently provided by the user based on the gender-neutral grammar;

(d) identifying a gender of the user from one or more of the words recognized in (c), based on gender-specific characteristics of the written language of the user; and (e) adjusting a confidence level associated with the words recognized in (c) based on a comparison of the identified genders obtained in (b) and (d).

7. The method recited in claim 1, further comprising providing subsequent prompts to the user based at least in part upon the identified gender of the user.

8. The method recited in claim 7, wherein said prompts are provided in written form.

9. The method recited in claim 1, wherein the words provided by a user are provided by the user in written form.

10. A system for conducting a dialogue between a user and a computer, the system comprising:

a speech application executing on the computer that carries out the dialogue, wherein the dialogue comprises a plurality of states;

an automatic speech recognizer (ASR) that, at the direction of the speech application, recognizes words provided by the user in response to a prompt at a given state of the dialogue based on a grammer specified by the speech application for that state; and a memory device that stores, for each of at least some of the states of the dialogue, a gender-neutral grammer for that state, the system identifying a gender of the user from one or more of the words recognized by the ASR at a given state using the gender-neutral grammar for that state, based on gender-specific characteristics of the written language of the user, including the tense of the written language.

11. The system recited in claim 10, wherein the speech application is designed to prompt the user at a particular state in the dialogue to elicit a response from the user that is expected to exhibit the gender-specific characteristics.

12. The system recited in claim 10, wherein the ASR comprises a speaker independent, continuous speech recognizer.

13. The system recited in claim 10, wherein the memory deivce also stores, for each of the at least some states, at least one gender-specific grammar for that state, and wherein after an identification of the gender of the user is made, the speech application selects for use by the ASR at a subsequent state a gender-specific grammar for that state based on the identification of the gender of the user.

14. The system recited in claim 13, wherein the at least one gender-specific grammar for a given state comoprises a first grammar specific to a male gender and a second grammar specific to a female gender, the speech application selecting one of the first and second gender-specific grammars based on the identification of the gender of the user.

15. The system recited in claim 13, wherein the speech application reverts to a gender-neutral grammar at a subsequent state if the use of a gender-specific grammar at a prior state results in a recognition of words provided by a user having an associated confidence level that is below a predetermined threshold.

16. The system recited in claim 10, wherein a confidence level associated with a recognition of words by the ASR at one state is adjusted based on a comparison of a gender identification made for that state with a gender identification made for a different state.

17. The sytem recited in claim 10, wherein the speech application selects a prompt to be played to the user at a given state based at least in part on a prior identification of the gender of the user.

18. The system recited in claim 10 wherein prompts are provided to the user in written form.

19. The system recited in claim 10 wherein the words recognized by the system are provided by a user in written form.

20. A computer-readable medium having stored thereon program code for improving the performance of a speech application deployed in an environment in which the written language of a user exhitibs gender specific characteristics, the program code, when executed by a computer, causes the computer to:

(a) recognize words provided by a user based on a gender-neutral grammar; and (b) identify a gender of the user from one or more of the recognized words provided by the user, based on gender-specific characteristics of the written language of the user, including the tense of the written language.

21. The computer-readable medium recited in claim 20, wherein the program code further causes the computer to:

(c) recognize words subsequently provided by the user based on a grammar specific to the identified gender of the user.

22. The computer-readable medium recited in claim 21, wherein the program code causes the computer to perform (b) and (c) only if a confidence level associated with the recognition of words in (a) is above a predetermined threshold.

23. The computer-readable medium recited in claim 21, wherein the program code causes the computer to repeat (a) and (b) if a confidence level associated with the recognition of words in (c) is below a predetermined threshold.

24. The computer-readable medium recited in claim 21, wherein prior to performing (a), the program code causes the computer to prompt the user to elicit a response from the user that is likely to exhibit the gender-specific characteristics.

25. The computer-readable medium recited in claim 20, wherein the program code further causes the computer to:

(c) recognize words subsequently provided by the user based on the gender-neutral grammar;

(d) identity a gender of the user from one or more of the words recognized in (c), based on gender-specific characteristics of the written language of the user; and (e) adjust a confidence level associated with the words recognized in (c) based on a comparison of the identified genders obtained in (b) and (d).

26. The computer-readable medium recited in claim 20, wherein the program code further causes the computer to provide subsequent prompts to the user based at least in part upon the identified gender of the user.

27. The computer-readable medium recited in claim 26, wherein said prompts are provided in written form.

28. The computer-readable medium recited in claim 20, wherein the words provided by a user in written form.

* * * * *